US009841354B2

(12) United States Patent
Cheung et al.

(10) Patent No.: US 9,841,354 B2
(45) Date of Patent: Dec. 12, 2017

(54) DIAGNOSIS OF INTERNAL COMBUSTION ENGINE PERFORMANCE

(71) Applicant: Hong Kong Baptist University, Hong Kong (HK)

(72) Inventors: Jeffrey Tai Kin Cheung, Hong Kong (HK); Fanglida Yan, Hong Kong (HK)

(73) Assignee: Hong Kong Baptist University, Hong Kong (HK)

( * ) Notice: Subject to any disclaimer, the term of this patent is extended or adjusted under 35 U.S.C. 154(b) by 260 days.

(21) Appl. No.: 14/696,496

(22) Filed: Apr. 27, 2015

(65) Prior Publication Data

US 2015/0308925 A1 Oct. 29, 2015

Related U.S. Application Data

(60) Provisional application No. 61/985,454, filed on Apr. 28, 2014.

(51) Int. Cl.
*G01M 15/12* (2006.01)
*G01M 15/04* (2006.01)
*G01M 17/04* (2006.01)

(52) U.S. Cl.
CPC ............ *G01M 15/04* (2013.01); *G01M 15/12* (2013.01); *G01M 17/04* (2013.01)

(58) Field of Classification Search
CPC ............... F02D 35/027; F02D 41/1497; F02D 2200/1015; F02D 2041/288; G01M 15/04; G01M 15/11; G01M 15/12; G01M 7/04; G01L 23/221; G01L 23/225
See application file for complete search history.

(56) References Cited

U.S. PATENT DOCUMENTS

| 6,388,444 B1 * | 5/2002 | Hahn ...................... G01M 15/11 123/406.24 |
| 7,133,761 B2 * | 11/2006 | Ancimer ............... F02D 35/028 123/435 |
| 7,444,231 B2 * | 10/2008 | Ancimer ............... F02D 35/027 123/406.21 |
| 7,571,640 B2 * | 8/2009 | Andrews ............... G01M 15/12 73/114.07 |

(Continued)

FOREIGN PATENT DOCUMENTS

| WO | 2008119159 A1 | 10/2008 |
| WO | 2009065549 A1 | 5/2009 |
| WO | 2009067804 A1 | 6/2009 |

OTHER PUBLICATIONS

International Search Report dated Jul. 20, 2015 for a related PCT application No. PCT/CN2015/077731.

*Primary Examiner* — Natalie Huls
(74) *Attorney, Agent, or Firm* — Spruson & Ferguson (HK)

(57) ABSTRACT

This invention provides a non-invasive method for diagnosing performance of a vehicle. The method comprises using a 3-axis accelerometer to perform diagnosis of the performance of an internal combustion engine, the performance of the engine including an engine power loss and one or more flaws associated with the engine mount. The method is also usable for diagnosing deterioration of a suspension system of said vehicle. An apparatus comprising a 3-axis accelerometer for diagnosing performance of a vehicle is also provided. In one embodiment, the 3-axis accelerometer is embedded in a smart phone.

13 Claims, 8 Drawing Sheets

(56) References Cited

U.S. PATENT DOCUMENTS

| | | | | |
|---|---|---|---|---|
| 8,108,131 B2* | 1/2012 | Huang | .................... | G01M 15/11 |
| | | | | 123/406.27 |
| 8,739,613 B2* | 6/2014 | Mair | ....................... | G01M 15/11 |
| | | | | 73/114.02 |
| 2003/0079528 A1* | 5/2003 | Wittliff | .................... | G01M 3/26 |
| | | | | 73/114.11 |
| 2008/0228341 A1* | 9/2008 | Orifij | ....................... | F02D 41/22 |
| | | | | 701/31.4 |
| 2010/0286893 A1* | 11/2010 | Huang | ................. | G01M 15/08 |
| | | | | 701/103 |
| 2011/0132326 A1* | 6/2011 | Leone | .................. | F02D 41/003 |
| | | | | 123/406.45 |
| 2014/0121934 A1* | 5/2014 | Dooley | ..................... | F02C 9/46 |
| | | | | 701/100 |
| 2014/0222298 A1* | 8/2014 | Gurin | ................. | B60W 50/085 |
| | | | | 701/49 |

* cited by examiner

DIAGNOSIS OF INTERNAL COMBUSTION ENGINE PERFORMANCE

CROSS-REFERENCE TO THE RELATED APPLICATIONS

This application claims the benefit of U.S. Provisional Patent Application Ser. No. 61/985,454 filed on Apr. 28, 2014, which is hereby incorporated by reference in its entirety.

FIELD OF THE INVENTION

This invention relates a non-invasive method to diagnose the performance of an internal combustion engine. More particularly, it relates to the use of a 3-axis accelerometer to perform a non-invasive diagnosis of the performance of an internal combustion engine in a vehicle. The invention has application in providing information for scheduling timely "conditional maintenance" to maximize engine performance at the lowest cost.

BACKGROUND OF THE INVENTION

The internal combustion engine is one of the corner stone inventions that have revolutionised the power generation industry, which included, inter alia, the automotive industry, the mechanical power industry, etc. Ever since its invention and further development throughout the years, there have been many inventions proposed to monitor the performance and to diagnose the problems of such engines as part of the engine maintenance process. Among various engine problems, one major cause is misfiring of the cylinders due to fuel line fault, timing belt malfunction (for gasoline engine), valve or piston ring leakage. Other engine performance issues involve mechanical malfunction due to tear and wear of various parts and loose linkages. Each problem will result in a characteristic signature in the engine vibration spectra in measurement location, peak frequency, shape and relative intensities along different directions. Therefore, in principle, a periodic routine monitoring of the engine vibration will provide information on the engine status. There have been many previous reports and patents on the use of accelerometer to diagnose internal combustion engine performance. All these prior arts apply complex systems and/or multiple sensors to try and monitor and/or diagnose this problem. Some of these prior art solutions even require the vehicle to be in a mobile state. Others need to have invasive probing of the internal combustion engine system. Thus, the methods disclosed in the prior arts require the diagnoses of an internal combustion engine to be conducted by a skilled professional and/or to be conducted in a specially equipped facility.

There is a need for a simple and non-invasive diagnosis of internal combustion engines.

Citation or identification of any reference in this section or any other section of this application shall not be construed as an admission that such reference is available as prior art for the present application.

SUMMARY OF THE INVENTION

The present invention provides a non-invasive method to diagnose the performance of an internal combustion engine. In a first aspect of the present invention there is provided the use of a 3-axis accelerometer embedded in a smart phone to perform a non-invasive diagnosis of the performance of an internal combustion engine in a vehicle. In a second aspect of the present invention there is provided an application in providing information for scheduling timely "conditional maintenance" to maximize engine performance at the lowest cost. In a third aspect of the present invention there is provided a simple non-invasive technique for providing periodic monitoring of engine performance, identifying the onset of engine malfunctioning and providing timely "conditional maintenance" to correct the identified problems in a timely way.

In a first aspect of the present invention there is provided a method to diagnose the performance of a vehicle in a non-invasive manner using at least one 3-axis accelerometer, each placed at a different location of the vehicle, wherein said method can diagnose the internal combustion engine performance of said vehicle comprising the engine power loss and one or more flaws associated with the engine mount and other parts, and said method can further diagnose the deterioration of the suspension system of said vehicle.

In a first embodiment of the first aspect of the present invention there is provided a method wherein the engine power loss is due to misfiring in one or more engine cylinders.

In a second embodiment of the first aspect of the present invention there is provided a method wherein the at least one 3-axis accelerometer comprises a stand alone unit with appropriate data storage and transmitting function, or is embedded in an apparatus including a smartphone or a computing device.

In a third embodiment of the first aspect of the present invention there is provided a method wherein the at least one 3-axis accelerometer is placed in a vehicle to perform the diagnosis.

In a fourth embodiment of the first aspect of the present invention there is provided a method wherein the misfiring in one or more engine cylinders is diagnosed via monitoring a gradual change in vibrational spectral features of a vehicle by using the at least one 3-axis accelerometer.

In a fifth embodiment of the first aspect of the present invention there is provided a method wherein the vibrational spectral features comprise width and intensity of a single peak compromising the overlapping of multiple peaks from firing different cylinders in a synchronized sequence or multiple peaks caused by the firing of the sequence of power strokes which are out of synchronization.

In a sixth embodiment of the first aspect of the present invention there is provided a method wherein the one or more flaws associated with the engine mount is diagnosed via monitoring the intensity ratio of the vibration peak at the same frequency in the "sway" direction versus the "surge" direction and the heave vibration of said engine.

In a seventh embodiment of the first aspect of the present invention there is provided a method wherein the at least one 3-axis accelerometer, each placed at a different location, is arranged to measure vibration of said vehicle such that correlation of said measurements further identifies problems with the engine and/or the engine mount and/or the suspension system of said vehicle.

In an eighth embodiment of the first aspect of the present invention there is provided a method wherein the deterioration of the suspension system of said vehicle is diagnosed via monitoring the total intensity of heaving motion vibration of the suspension system of said vehicle during passenger loading.

In a second aspect of the present invention there is provided an apparatus to diagnose the performance of a vehicle in a non-invasive manner. Said apparatus comprises at least one 3-axis accelerometer. Said apparatus can diagnose the internal combustion engine performance of said vehicle, comprising the engine power loss and one or more flaws associated with the engine mount, and said apparatus can further diagnose deterioration of the suspension system of said vehicle.

In a first embodiment of the second aspect of the present invention there is provided an apparatus wherein the engine power loss is due to misfiring in one or more engine cylinders.

In a first embodiment of the second aspect of the present invention there is provided an apparatus wherein the at least one 3-axis accelerometer is placed in a vehicle to perform the diagnosis.

In a second embodiment of the second aspect of the present invention there is provided an apparatus wherein the misfiring in one or more engine cylinders is diagnosed via monitoring a gradual change in vibrational spectral features of a vehicle by using the at least one 3-axis accelerometer.

In a third embodiment of the second aspect of the present invention there is provided an apparatus wherein the vibrational spectral features comprise width and intensity of one or more power stroke peaks.

In a fourth embodiment of the second aspect of the present invention there is provided an apparatus wherein the one or more flaws associated with the engine mount is diagnosed via monitoring the intensity ratio of the "sway" vibration versus the "surge" vibration of said engine.

In a fifth embodiment of the second aspect of the present invention there is provided an apparatus wherein the deterioration of the suspension system of said vehicle is diagnosed via monitoring the intensity of heaving motion vibration of the suspension system of said vehicle during passenger loading.

In a sixth embodiment of the second aspect of the present invention there is provided an apparatus wherein the at least one 3-axis accelerometer, each placed at a different location, is arranged to measure vibration of said vehicle, said apparatus correlating measurements to identify further problems with the engine and/or the engine mount and/or the suspension system of said vehicle.

Throughout this specification, unless the context requires otherwise, the word "include" or "comprise" or variations such as "includes" or "comprises" or "comprising", will be understood to imply the inclusion of a stated integer or group of integers but not the exclusion of any other integer or group of integers. It is also noted that in this disclosure and particularly in the claims and/or paragraphs, terms such as "included", "comprises", "comprised", "comprising" and the like can have the meaning attributed to it in U.S. Patent law; e.g., they can mean "includes", "included", "including", and the like; and that terms such as "consisting essentially of" and "consists essentially of" have the meaning ascribed to them in U.S. Patent law, e.g., they allow for elements not explicitly recited, but exclude elements that are found in the prior art or that affect a basic or novel characteristic of the present invention.

Furthermore, throughout the specification and claims, unless the context requires otherwise, the word "include" or variations such as "includes" or "including", will be understood to imply the inclusion of a stated integer or group of integers but not the exclusion of any other integer or group of integers.

Other definitions for selected terms used herein may be found within the detailed description of the present invention and apply throughout. Unless otherwise defined, all other technical terms used herein have the same meaning as commonly understood to one of ordinary skill in the art to which the present invention belongs.

Other aspects and advantages of the present invention will be apparent to those skilled in the art from a review of the ensuing description.

BRIEF DESCRIPTION OF THE DRAWINGS

The above and other objects and features of the present invention will become apparent from the following description of the present invention, when taken in conjunction with the accompanying drawings.

FIG. 4($b$) shows the power stroke peaks in expanded frequency scale before and after maintenance to clearly indicate the effect of misfiring.

DETAILED DESCRIPTION OF THE INVENTION

Figure 1:
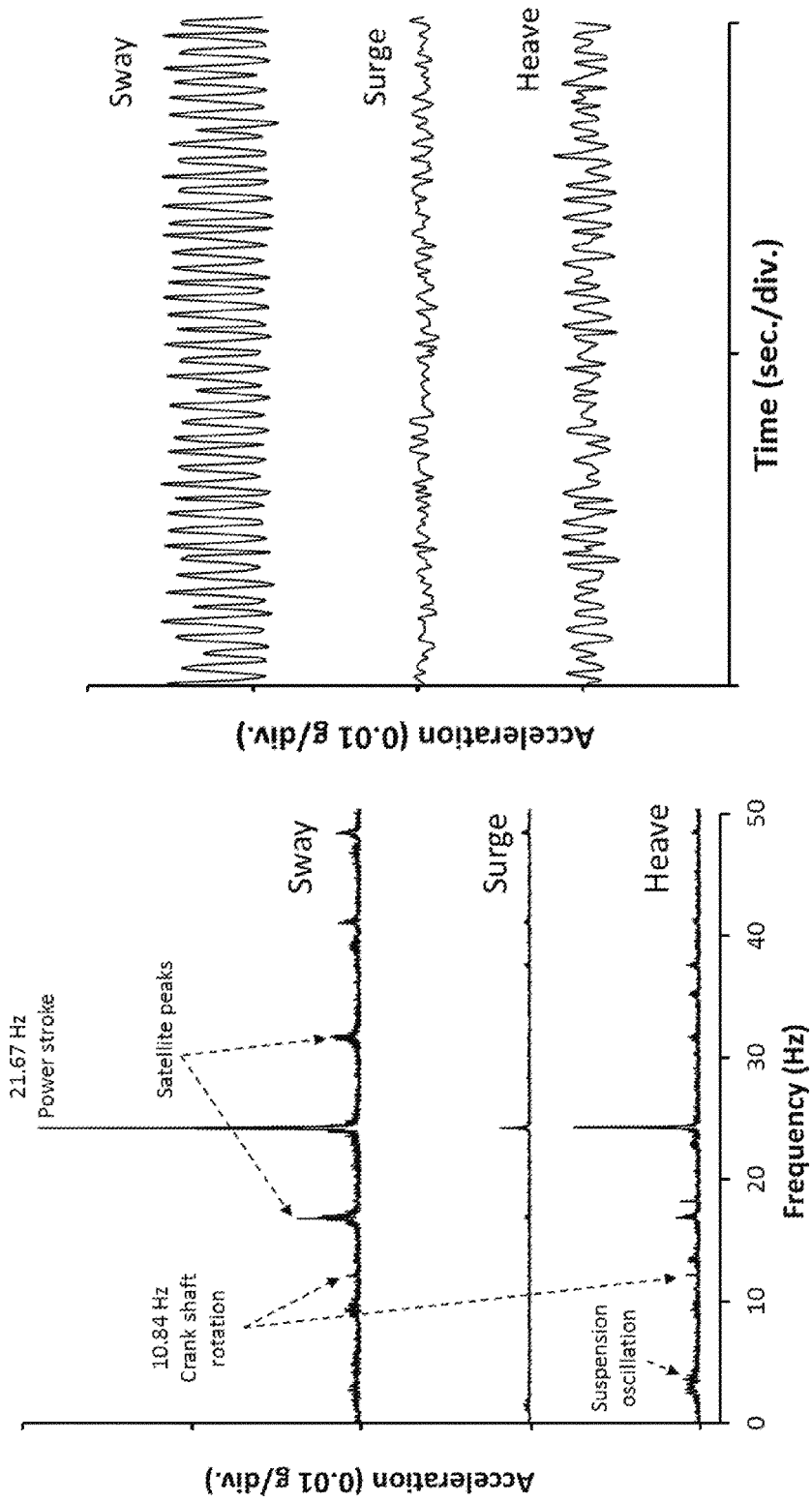
FIG. 1 shows a set of vibrational spectra in sway, heave and surge directions both in time and frequency domain for a minibus at an idling speed of 650 rpm (approx.). The vehicle is a 16-passenger minibus of Toyota Coaster model with a front inline mount 4-cylinder diesel engine.

The presently claimed invention is further illustrated by the following experiments or embodiments which should be understood that the subject matters disclosed in the experiments or embodiments may only be used for illustrative purpose but are not intended to limit the scope of the presently claimed invention.

This invention uses a 3-axis accelerometer either as a stand-alone unit or as a unit embedded in a smart phone or MP3 player (e.g. in this case, we use an iPod 4, 5 or iPod 4 and 5 embedded with a STMicro 3-axis accelerometer). With detection limit for acceleration of 0.003 g where g=9.8 m/s$^{-2}$ is the gravitation coefficient, the detection limit in the displacement is $10^{-4}$ m for 10 Hz vibration, $2.5 \times 10^{-5}$ m for 20 Hz vibration and even smaller for higher frequencies. With this sensitivity coupled with the intrinsic large vibration of the vehicles studied, we found the sensor placement on the hard, flat floor surface in the passenger compartment floor to be sufficient. For minibus and double deck bus, a one minute measurement at 100 Hz data rate is sufficient. For well-tuned small passenger cars, such as those shown in FIG. 7, the much smaller vibration amplitude requires the placement of the sensor directly on the engine block in order to yield sufficient signal level. However, the underlying principle remains valid. Among vehicles that we have studied are:

Hong Kong 16 passenger Minibus: Toyota Coaster Model (front 4-cylinder inline diesel engine)

24 passenger van: Mitsubishi Rosa Model (front 4-cylinder inline diesel engine)

Hong Kong Double Deck Bus (rear inline mount 6-cylinder Volvo diesel engine)

Isuzu 60 passenger bus (rear 6-cylinder inline mount diesel engine)

4-door Sedan: Toyota Avalon (front side mount 6-cylinder gasoline engine)

6-passenger van: Mazda 5 (front side mount 4-cylinder gasoline engine)

4-door sedan: Toyota Camry (front side mount 6-cylinder gasoline engine)

Results described in this invention are mostly based on Toyota Coaster Model used by Hong Kong Minibuses and Volvo double deck bus with 6-cylinder inline engine used by Hong Kong Bus Company. However, same principle is also applicable to other models even for those not in the above list as well as speciality non-passenger vehicles such as tractor, earth mover and other heavy machinery.

It is essential to have measurements made when the engine was idling at a constant speed or RPM (rotation per minute). Unfiltered data were taken at 100 Hz rate for 1 minute. Data from the first five and last five seconds were discarded, leaving approximate 4,500 data points for Fast Fourier Transformation (FFT) analysis to yield a vibrational spectrum from 0 to 50 Hz. Vibrations along three orthogonal axes are designated as: Surge (front and back), Sway (left and right), and Heave (up and down). Due to the small displacement associated, movement about the three rotational degrees of freedom such as Pitch, Roll and Yaw, are ignored. With the 3-axis accelerometer accuracy of 0.003 g, the displacement detection limit is approximate $10^{-4}$ m for 10 Hz oscillation and $0.25 \times 10^{-4}$ m for 20 Hz oscillation. This high sensitivity enables measurements to be made without the need to place the tri-axial accelerometer directly on the engine block in most cases including both types of vehicles described in this document.

Figure 2:
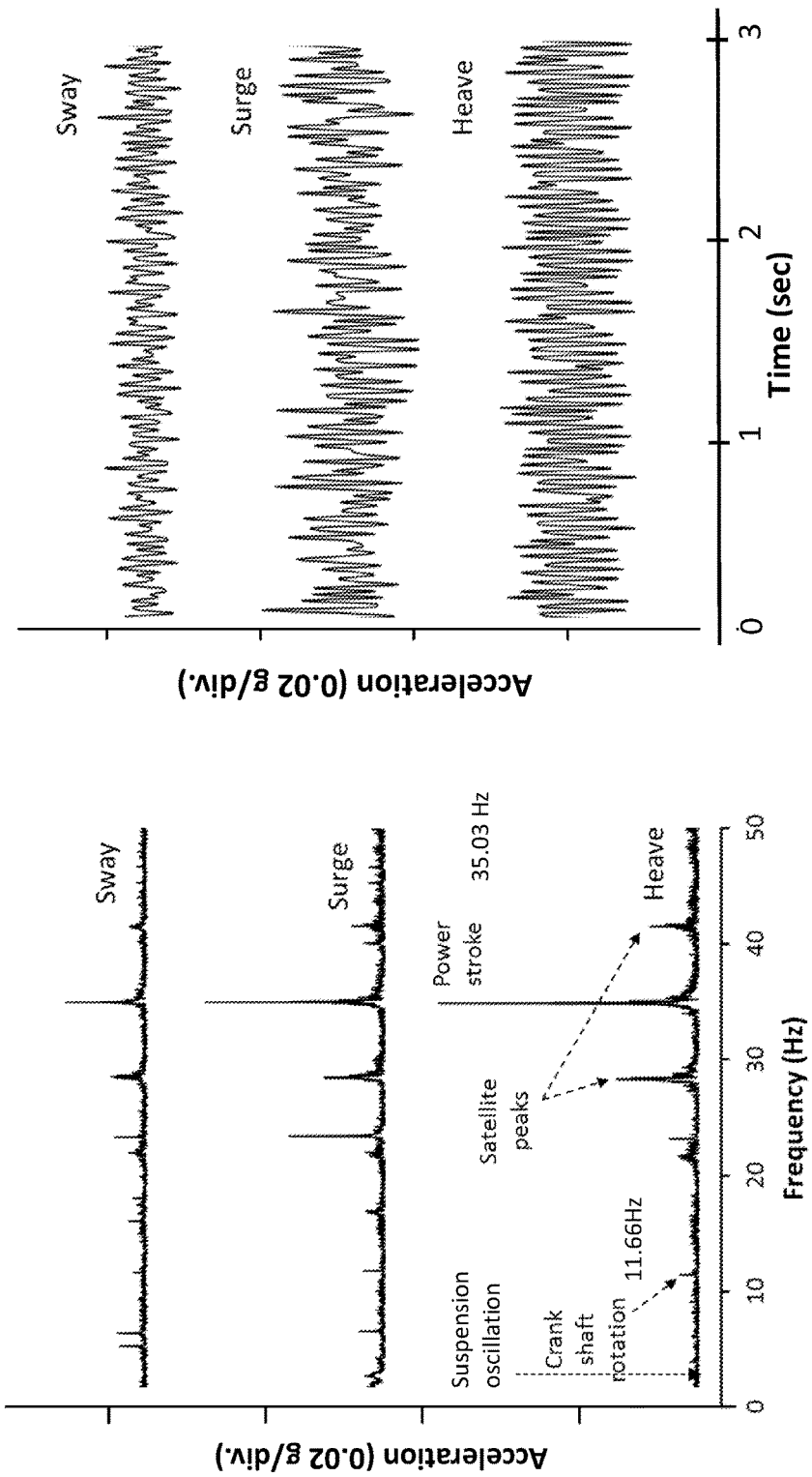
FIG. 2 shows a set of vibrational spectra in sway, surge and heave directions for a double deck bus (Bus 1) both in time and frequency domain at an idling speed of 700 rpm (approx.). The vehicle is a double deck bus of Volvo model with a rear inline mount 6-cylinder diesel engine.

FIG. 1 and FIG. 2 show two sets of vibrational spectra in all three directions in both time and frequency domain, one for a minibus at an idling speed of 640 rpm (approx.) and the other for a double deck bus at 700 rpm (approx.). For the minibus, the iPhone was placed beneath the right corner seat of the last row, which was about 5 meters from the engine. For the double deck bus, the iPhone was placed underneath the left side seat of row 9 on the upper deck. Both spectra show a dominant peak which is at 35.003 Hz for the double deck bus and 21.674 Hz for the minibus. If these vibrations were caused by engine rotation, the idling speed of the engine can be calculated by multiplying these values by 60 to correspond to 2,100 rpm for the bus and 1,300 rpm for the minibus, respectively, which are much higher than the measure engine rpm. For the minibus, it is exactly 2× of the value of the actual engine rpm reading. For the double deck bus, it is exactly 3× of the engine rpm. The discrepancy can be interpreted by examining the operational sequence of a single cylinder during a four stroke diesel cycle or other internal combustion cycle.

Figure 3:
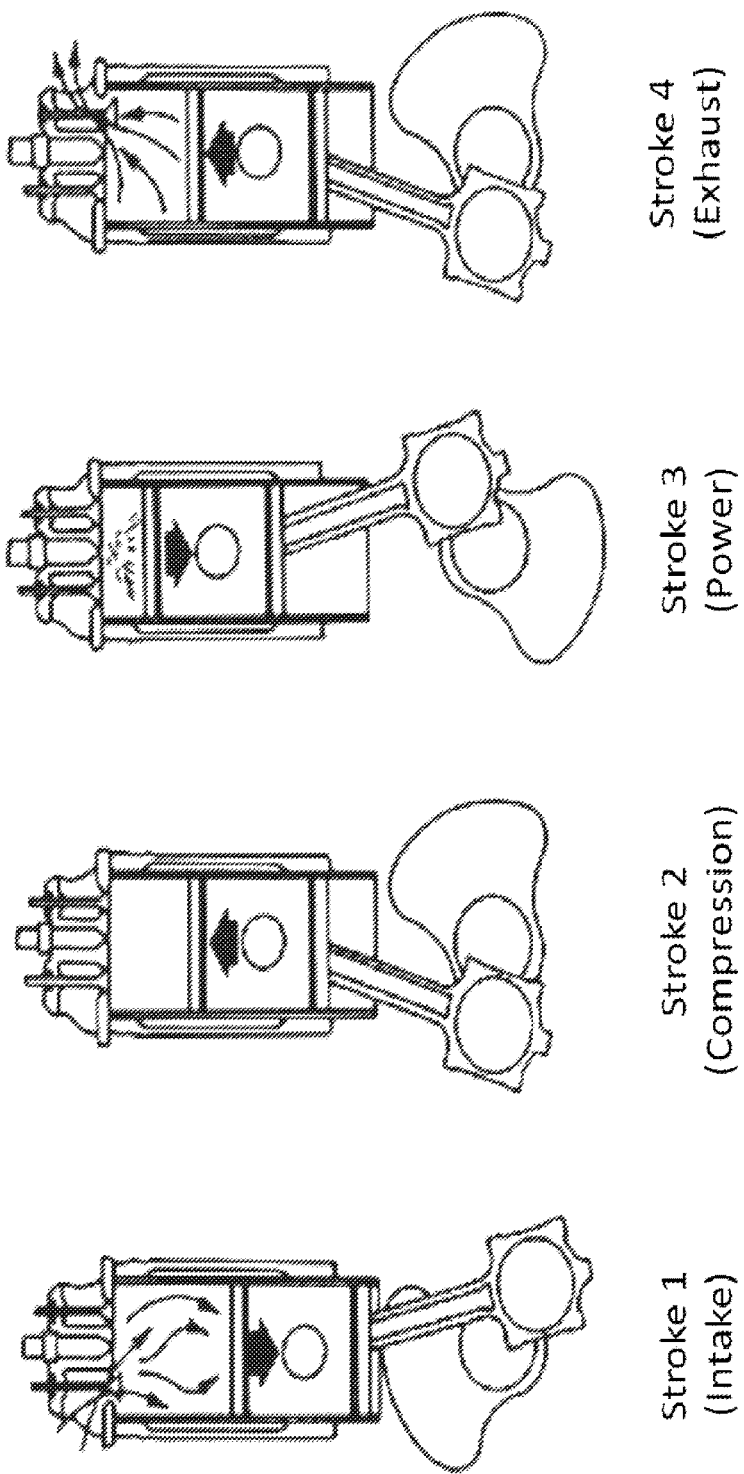
FIG. 3 shows the piston movement during a 4-stroke cycle.

FIG. 3 depicts the piston movement during a 4-stroke cycle. Each cycle completes two engine rotations.

The first rotation consists of the intake and compression stroke driven by the inertia of a flywheel connected to crank shaft. The second rotation consists of the ignition and the exhaust stroke. Power is delivered by this rotation during the ignition stroke. Therefore, it is commonly referred to as the power stroke which is the source of engine noise and vibration. Therefore, according to this operational sequence, the number of power strokes produced per cylinder per minute is related to the engine RPM as:

$$\text{Number of power} \frac{\text{strokes}}{\text{minute}} = \frac{RPM}{2}$$

For an engine with "N" cylinders:

$$\text{Number of power} \frac{\text{strokes}}{\text{minute}} = N \times \frac{RPM}{2} \tag{1}$$

For example, for a 4-cylinder diesel engine of a minibus, N=4

$$\text{Number of power} \frac{\text{strokes}}{\text{minute}} = 2 \times RPM \tag{2}$$

And for the 6-cyliner engine of a bus, N=6

$$\text{Number of power} \frac{\text{strokes}}{\text{minute}} = 3 \times RPM \tag{3}$$

Based on the above relationship and from the position of the dominant vibration peak and the engine RPM, it is clear that the dominant vibrations in both the 4 cylinder and 6 cylinder engines are caused by the power stroke. The amount of vibration caused by engine crankshaft rotation only appears as a very weak but well-defined peak at the exact ½ and ⅓ of the power stroke related peak for a 4 and 6 cylinder engine according to equations (2) and (3), respectively.

Other discernible peaks include the pair of satellite peaks of the dominant peak symmetrically placed. They are due to Fast Fourier Transformation process used in data processing. In the time domain, there is clearly a low frequency component that appears in the range of 1-2 Hz in the frequency domain. They are due to the oscillation of the vehicle suspension. Their magnitude provides means to monitor the status of the suspension system. For engine with poor maintenance, peaks due to other causes related to wear and tear can also be detected. Their origin can be identified by a systematic study. This study will concentrate on the dominant peak due to power stroke and the small peak at exact fraction frequency due to crankshaft rotation.

Once we have identified the cause of the dominant peak, we can use its intensity, width and relative intensity along three axes to monitor engine performance, in particular, power loss due to misfiring. For an engine with multiple cylinders, cylinder movements are connected to a common crankshaft at precise phase angles and ignited sequentially at phase-matched time. Misfire by one or more cylinders can cause unsynchronized and uneven cylinder movement that leads to total power loss.

Figure 4A:
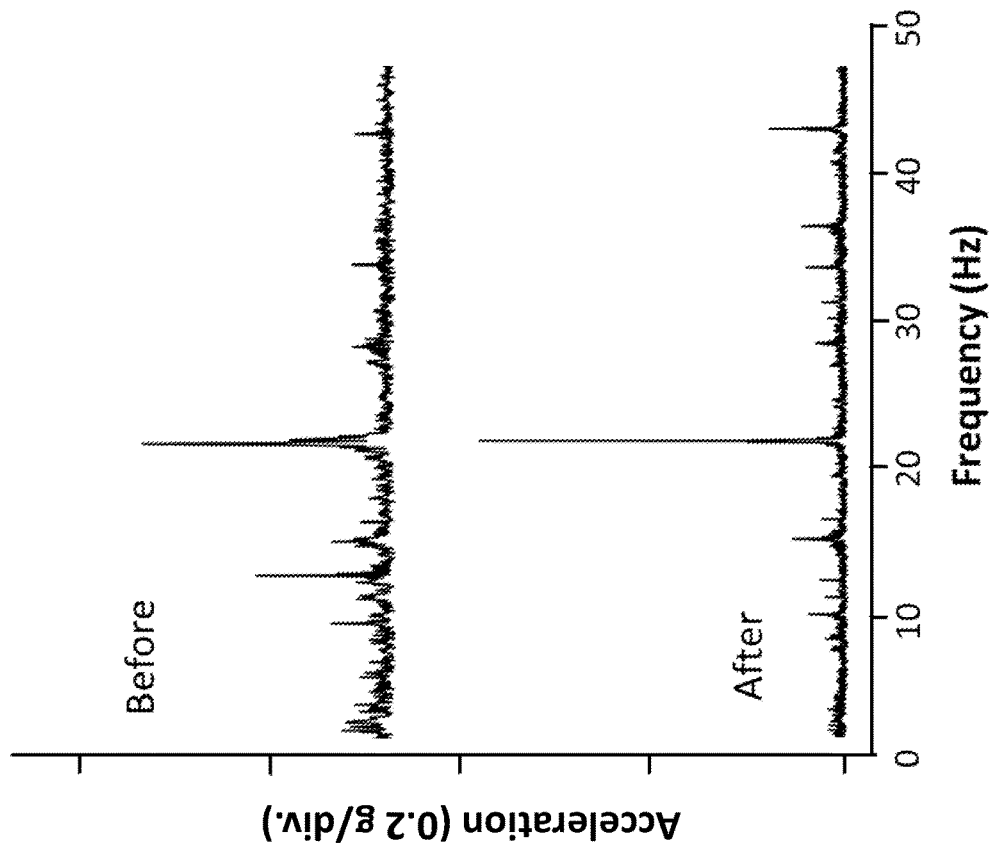
FIG. 4($a$) shows the vibrational spectrum of a same minibus as in FIG. 1 before and after maintenance.
Figure 4B:
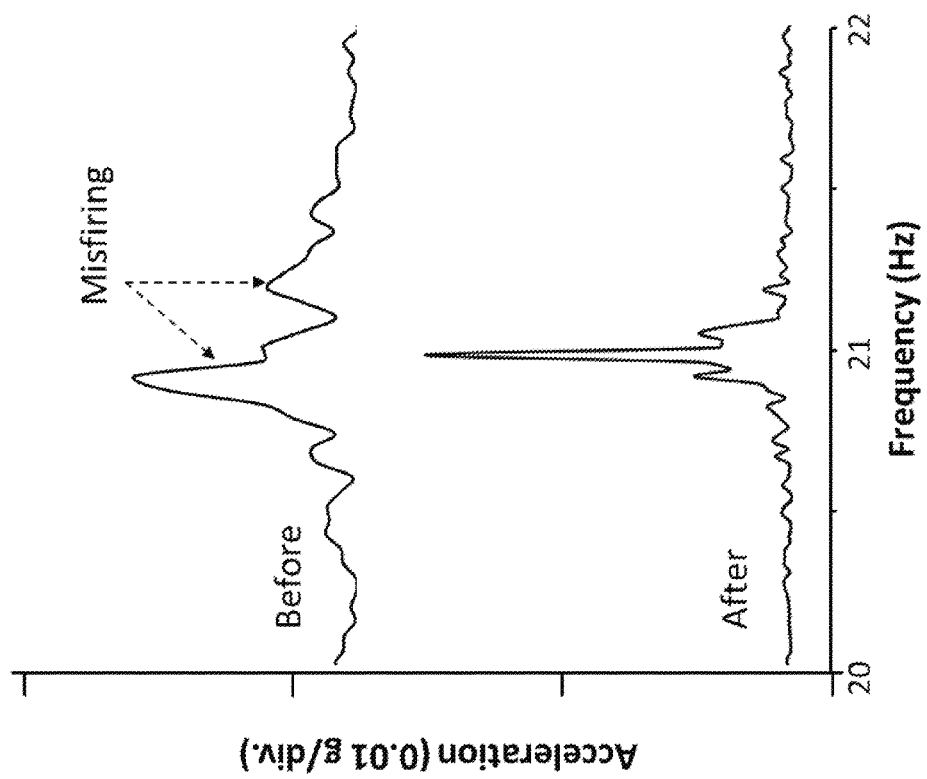
Figure 5:
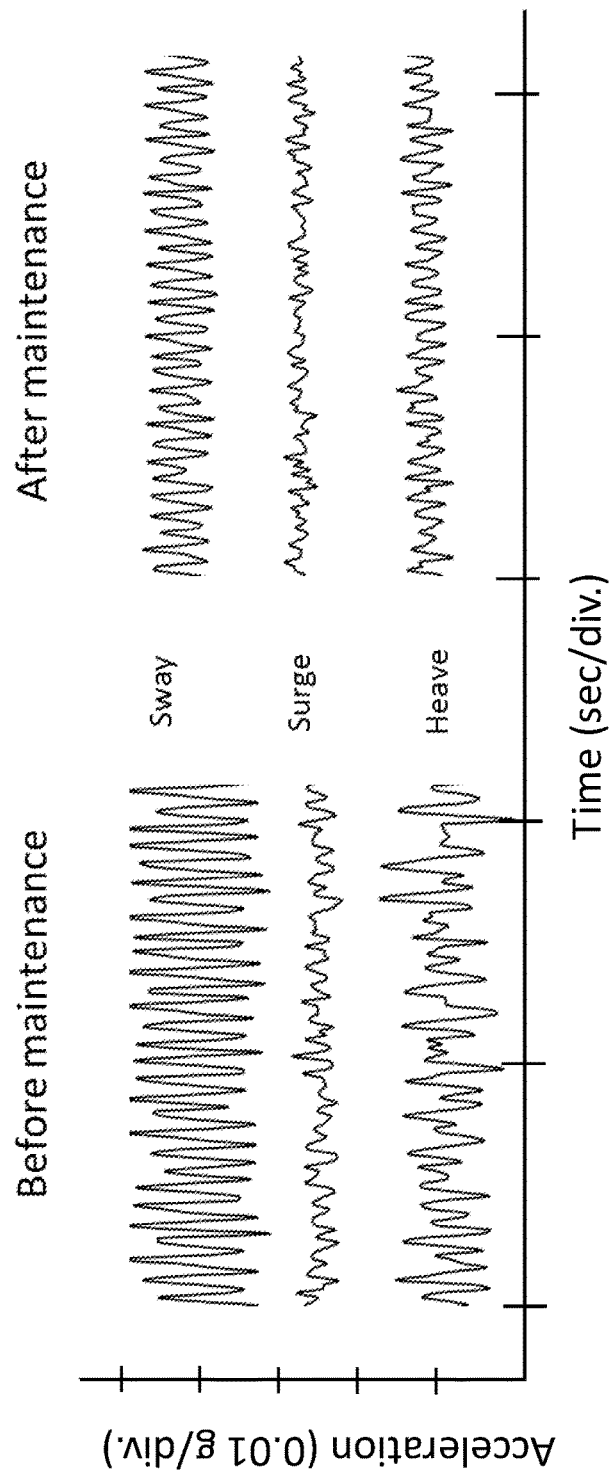
FIG. 5 shows the raw vibration data along three axes of the minibus before and after maintenance.

A large database was established on minibus engine performance by measuring the vibrational spectra of idling engine on a number of minibuses over a period of more than 5 months. During that time, we succeeded in detecting engine performance degradation in several occasions. After maintenance, we were able to confirm the engine regaining its performance. An example is shown in FIG. 4 and FIG. 5. FIG. 4 shows the vibrational spectrum of a same minibus before and after maintenance. During a period of time, we were able to monitor the gradual change in its vibrational spectral features, in particular the width and intensity of the power stroke peak at around 20 Hz with decreasing intensity and peak broadening that eventually led to splitting to small peaks shown in FIG. 4(*b*) in an expanded frequency scale. The change suggests misfiring condition. The misfiring condition not only reduces the power but also increases engine imbalance, which causes more vibration across a broadband of frequency. Consequently, the weak but well-defined peak at half its frequency due to engine rotation also broadened. This is more clearly depicted in FIG. 5, which shows the raw vibration data along three axes. The total vibration energy of the vehicle during engine idling is nears 5 times higher for the vehicle before maintenance. Another worthy point is the disappearance of a peak at 12.02 Hz after maintenance. The origin of the peak is not fully identified but caused by rough running of the engine.

Figure 6:
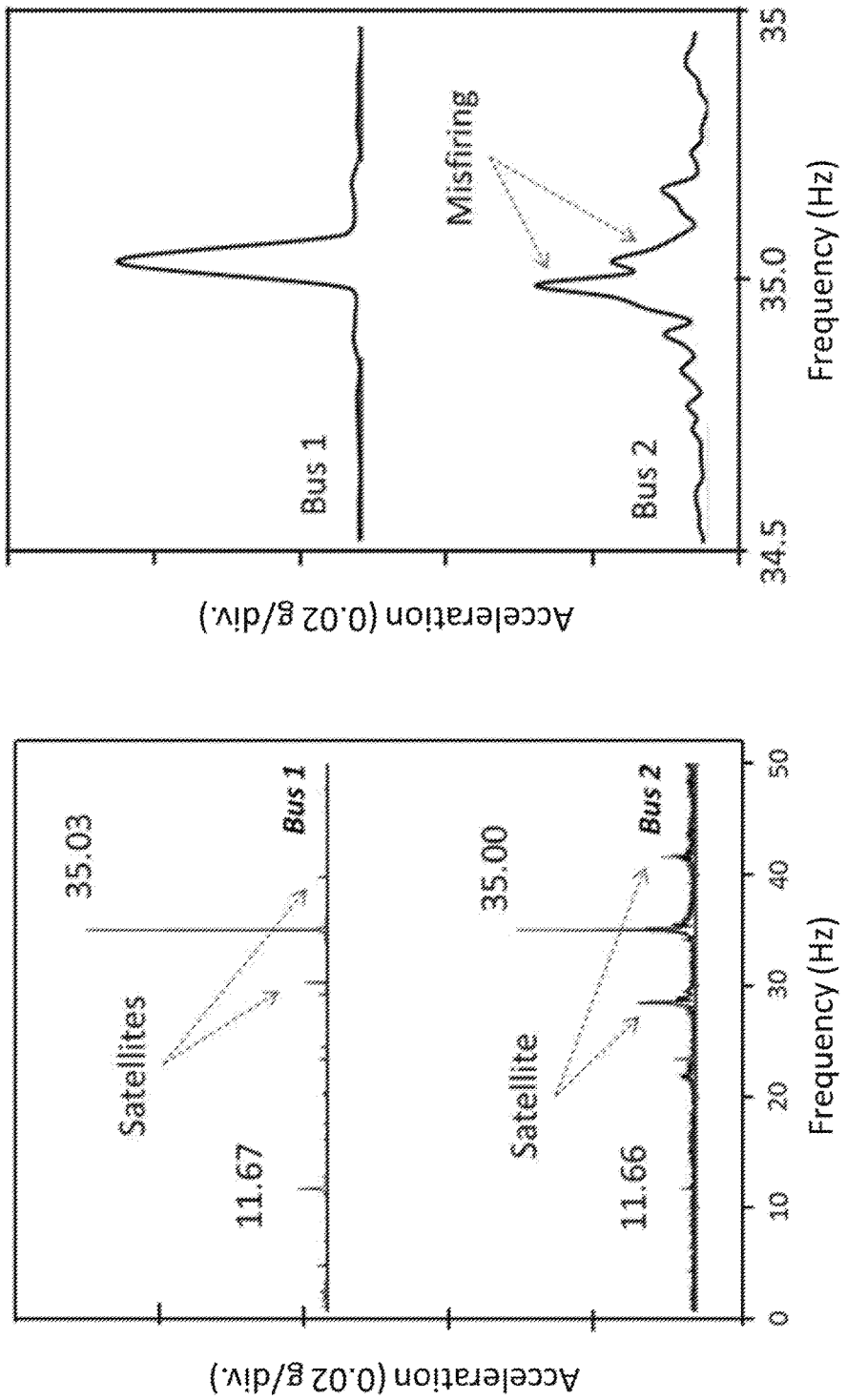
FIG. 6 shows the comparison of the heave oscillation spectra of two same model double deck buses from the same route (Volvo model with rear inline mount 6-cylinder diesel engine). In both cases, measurements were made at the same location in the mid-section of the upper deck.

Another set of two measurements were made on double deck buses of the same Volvo model with an inline 6-cylinder diesel engine mounted on the rear. Both measurements were made by placing the accelerometer on the midsection of the upper deck while the engine was idling at approximate 700 rpm. The vibration spectra of the heave oscillation are shown in FIG. 6(*a*) and FIG. 6(*b*). These two buses, though with the same model and route, show different features in the vibrational spectra that reveal different engine condition. FIG. 2 shows a set of very "clean spectra" with just a few peaks for oscillation in all three directions: sway, surge and heave. All are accountable. A major peak at 35.05 Hz is caused by the "power stroke" of the diesel cycle. Its position is exactly at the midpoint between two small satellite peaks; it is a result of Fast Fourier Transformation. Also easily identifiable is the peak caused by crankshaft rotation at 11.66 Hz, exactly one third of the frequency of the power stroke peak. The vibration spectra of the heave motion of the two buses are compared in FIG. 6. The engine of Bus 1 is clearly in better condition that that of Bus 2. In the latter, some misfiring is present.

Based on the data, we claim that this simple non-invasive technique can be used to provide period monitoring of engine performance, point out the onset of engine malfunctioning and provide timely "conditional maintenance" to correct the problem in a timely way.

In addition to the information related to engine rotation, the placement of the engine which can be either inline mount (crank shaft along the direction of the long axis of the vehicle) or side mount (crank shaft perpendicular to the direction of the long axis of the vehicle) can also be determined from the relative intensities of the power stroke peak along three axes. For an inline engine (e.g. Minibus), the "sway" vibration (side by side) is more dominant than the "surge" (forward and backward) vibration. While for a side mount engine, such as the bus, the "surge" vibration is more intense than the "sway" vibration. Therefore, the intensity ratio can be used to monitor the development of any flaw associated with engine mount.

Finally, as shown in FIG. 1 for the minibus and FIG. 4 for the double deck bus as well similar measurement with other type of vehicles, there is a group of small peaks at low frequency below 5 Hz. This group of peaks is caused by the slow heaving motion due to the vehicle suspension. The intensity can be used to monitor the suspension condition of the vehicle. A deterioration of the suspension system can be detected from routine monitoring of these low frequency peaks.

Figure 7:
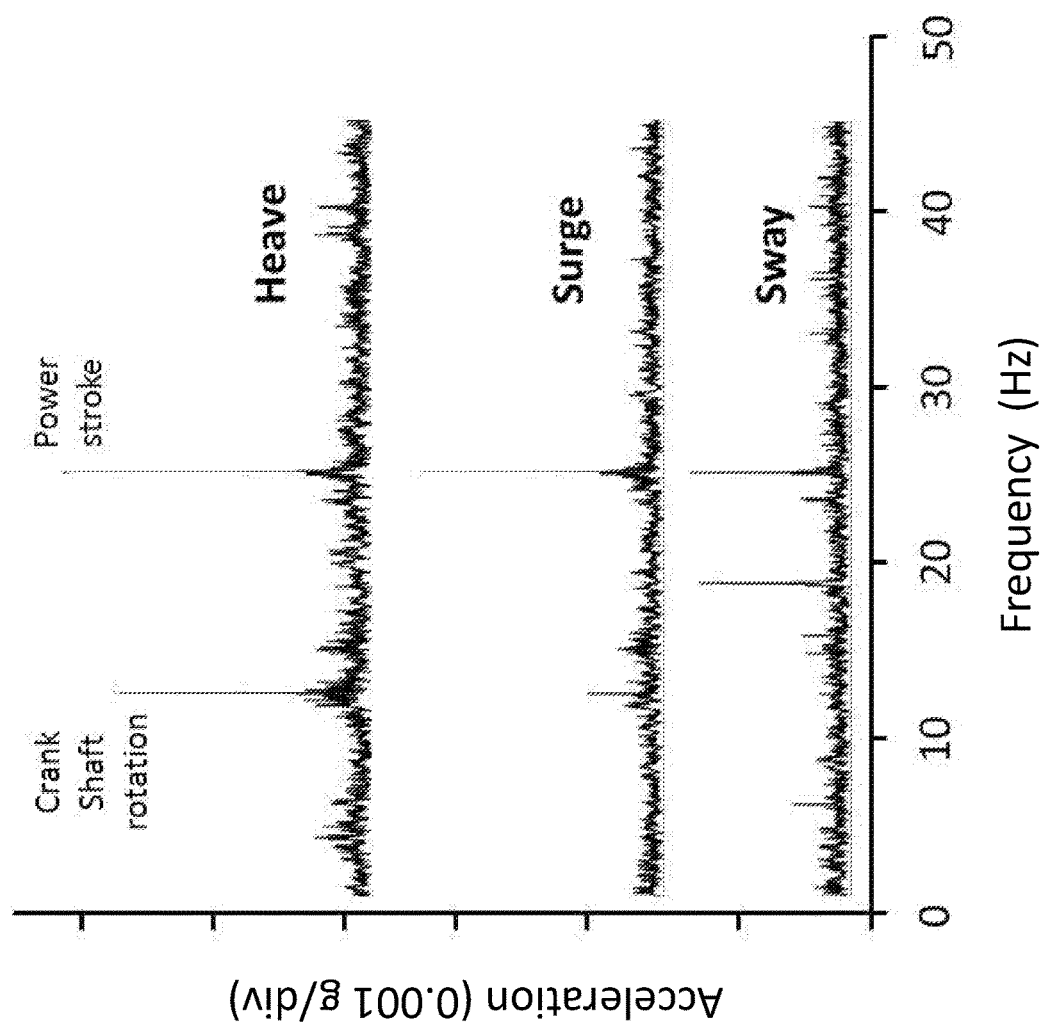
FIG. 7 shows the vibration spectra of a Mazda 5 model with a front side-mount 4-cylinder gasoline engine. Due to the low vibration, the sensor was placed on the engine block. The peaks due to power stroke (25.2 Hz) and crankshaft rotation (12.60 Hz) are clearly discernible despite the small magnitude of the vibration comparing to the diesel engine. A most notable feature is the surge direction peaks are more intense than the sway direction peaks due to the side-mount engine configuration.

FIG. 7 shows the vibration spectra along three axes of a Mazda 5 vehicle. It is a 4-cyliner gasoline engine mounted sideway. In comparison with diesel engines described above, the magnitude of vibration is an order of magnitude lower so the sensor was placed on the engine block for the measurement. The features observed for the diesel engines are clearly discernible. A notable feature to point out is the relative intensity of the power stroke peak. In the diesel engines discussed above, the intensity in the sway direction is stronger than the surge direction. In this case, due to the orientation of the side-mount engine, the intensity in the surge direction is stronger.

Some embodiments of the present invention are presented as follows as non-limiting examples. In a first aspect of the present invention there is provided a method to diagnose the performance of a vehicle in a non-invasive manner by using at least one 3-axis accelerometer, each placed at a different location of the vehicle, wherein said method can diagnose the internal combustion engine performance of said vehicle comprising the engine power loss and one or more flaws associated with the engine mount and other parts, and said method can further diagnose deterioration of the suspension system of said vehicle.

In a first embodiment of the first aspect of the present invention there is provided a method wherein the engine power loss is due to misfiring in one or more engine cylinders.

In a second embodiment of the first aspect of the present invention there is provided a method wherein the at least one 3-axis accelerometer comprises a stand alone unit with appropriate data storage and transmitting function or is embedded in an apparatus including a smartphone or a computing device.

In a third embodiment of the first aspect of the present invention there is provided a method wherein the at least one 3-axis accelerometer is placed in a vehicle to perform the diagnosis.

In a fourth embodiment of the first aspect of the present invention there is provided a method wherein the misfiring in one or more engine cylinders is diagnosed via monitoring a gradual change in vibrational spectral features of a vehicle by using the at least one 3-axis accelerometer.

In a fifth embodiment of the first aspect of the present invention there is provided a method wherein the vibrational spectral features comprise width and intensity of one or more power stroke peaks.

In a sixth embodiment of the first aspect of the present invention there is provided a method wherein the one or more flaws associated with the engine mount is diagnosed via monitoring the intensity ratio of the "sway" vibration versus the "surge" vibration of said engine.

In a seventh embodiment of the first aspect of the present invention there is provided a method wherein the at least one 3-axis accelerometer, each placed at a different location, is arranged to measure vibration of said vehicle such that correlation of said measurements further identifies problems with the engine and/or the engine mount and/or the suspension system of said vehicle.

In an eighth embodiment of the first aspect of the present invention there is provided a method wherein the deterioration of the suspension system of said vehicle is diagnosed via monitoring the intensity of heaving motion of said vehicle during passenger loading.

In a second aspect of the present invention there is provided an apparatus to diagnose the performance of a vehicle in a non-invasive manner using at least one 3-axis accelerometer wherein said apparatus can diagnose the internal combustion engine performance of said vehicle comprising the engine power loss and one or more flaws associated with the engine mount, and said method can further diagnose the deterioration of the suspension system of said vehicle.

In a first embodiment of the second aspect of the present invention there is provided an apparatus wherein the engine power loss is due to misfiring in one or more engine cylinders.

In a first embodiment of the second aspect of the present invention there is provided an apparatus wherein the at least one 3-axis accelerometer is placed in a vehicle to perform the diagnosis.

In a second embodiment of the second aspect of the present invention there is provided an apparatus wherein the misfiring in one or more engine cylinders is diagnosed via monitoring a gradual change in vibrational spectral features of a vehicle by using the at least one 3-axis accelerometer.

In a third embodiment of the second aspect of the present invention there is provided an apparatus wherein the vibrational spectral features comprise width and intensity of one or more power stroke peaks.

In a fourth embodiment of the second aspect of the present invention there is provided an apparatus wherein the one or more flaws associated with the engine mount is diagnosed via monitoring the intensity ratio of the "sway" vibration versus the "surge" vibration of said engine.

In a fifth embodiment of the second aspect of the present invention there is provided an apparatus wherein the deterioration of the suspension system of said vehicle is diagnosed via monitoring the intensity of the heaving motion of said vehicle during passenger loading.

In a sixth embodiment of the second aspect of the present invention there is provided an apparatus wherein the at least one 3-axis accelerometer, each placed at a different location, is arranged to measure vibration of said vehicle, said apparatus correlating the measurements to identify further problems with the engine and/or the engine mount and/or the suspension system of said vehicle.

INDUSTRIAL APPLICABILITY

The objective of the presently claimed invention is to provide a method to diagnose the performance of an internal combustion engine. More particularly, it relates to the use of a 3-axis accelerometer embedded in a smart phone to perform a non-invasive diagnosis of the performance of an internal combustion engine in a vehicle. The invention has applications in providing information for scheduling timely "conditional maintenance" to maximize engine performance at lower cost. This diagnostic approach is not limited to passenger vehicles such as minibus and double deck bus described above. It is also applicable to all systems that employ internal combustion engines such as heavy duty tractors, earth mover, cranes and other machinery.

What we claim is:

1. An apparatus for testing a vehicle in a non-invasive manner, the vehicle having an internal combustion engine, an engine mount and a suspension system, the apparatus comprising:

at least one 3-axis accelerometer, each arranged to be placed at a different location of the vehicle, for measuring a "sway" vibration, a "heave" vibration and a "surge" vibration of the engine; and a processor configured to non-invasively detect one or more flaws associated with the engine mount according to an intensity ratio of the "sway" vibration versus the "surge" vibration.

2. The apparatus according to claim 1 wherein the processor is further configured to non-invasively detect an engine power loss due to misfiring in one or more engine cylinders via monitoring a gradual change in vibrational spectral features of the measured "sway", "heave" and "surge" vibrations.

3. The apparatus according to claim 2 wherein the vibrational spectral features comprise width and intensity of one or more power stroke peaks.

4. The apparatus according to claim 1 wherein the processor is further configured to non-invasively detect a deterioration of the suspension system according to an intensity of the "heave" vibration during passenger loading.

5. The apparatus according to claim 1 wherein the processor is further configured to compute correlation of the measured "sway", "heave" and "surge" vibrations to identify further problems with the engine, the engine mount or the suspension system.

6. A method for testing a vehicle in a non-invasive manner, the vehicle having an internal combustion engine, an engine mount and a suspension system, the method comprising:

measuring, by at least one 3-axis accelerometer each placed at a different location of the vehicle, a "sway" vibration, a "heave" vibration and a "surge" vibration of the engine; and non-invasively detecting, by a processor, one or more flaws associated with the engine mount according to an intensity ratio of the "sway" vibration versus the "surge" vibration.

7. The method according to claim 6 wherein the at least one 3-axis accelerometer is embedded in a smartphone or a computing device.

8. The method according to claim 7 further comprising:
non-invasively detecting, by the processor, an engine power loss due to misfiring in one or more engine cylinders via monitoring a gradual change in vibrational spectral features of the measured "sway", "heave" and "surge" vibrations.

9. The method according to claim 8 wherein the vibrational spectral features comprise width and intensity of one or more power stroke peaks.

10. The method according to claim 6 wherein the at least one 3-axis accelerometer comprises a stand alone unit with appropriate data storage and transmitting function.

11. The method according to claim 10 further comprising:
placing the stand alone unit in the vehicle before measuring the "sway", "heave" and "surge" vibrations.

12. The method according to claim 6 further comprising:
computing, by the processor, correlation of the measured "sway", "heave" and "surge" vibrations to further identify problems with the engine, the engine mount or the suspension system.

13. The method according to claim 6 further comprising:
non-invasively detecting, by the processor, a deterioration of the suspension system according to an intensity of the "heave" vibration during passenger loading or during engine running.

* * * * *